Jan. 9, 1951 E. L. WALTERS 2,537,803
APPARATUS FOR SUPPORTING GLASS SHEETS DURING BENDING
Filed March 5, 1947
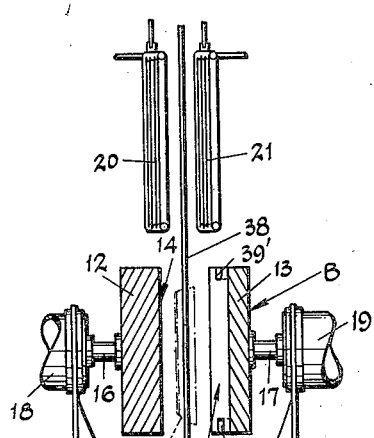
Fig. 1
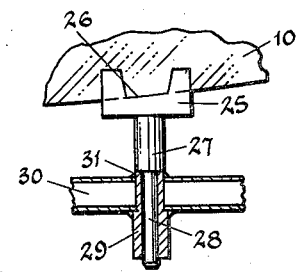
Fig. 4 Fig. 5
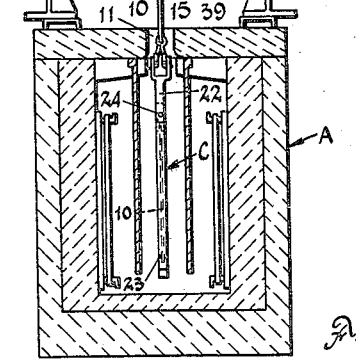
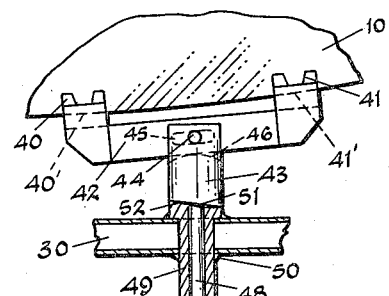
Fig. 6
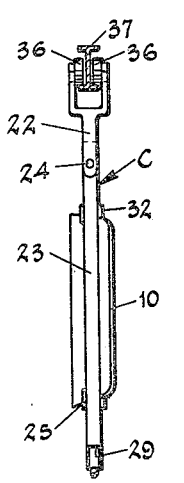
Fig. 3
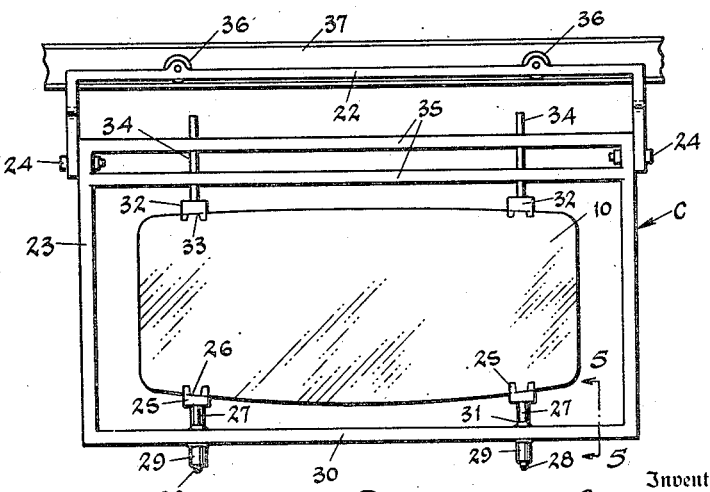
Fig. 2
Inventor
Emmett L. Walters
Nobbe & Swope
Attorneys Patented Jan. 9, 1951

2,537,803

UNITED STATES PATENT OFFICE 2,537,803

APPARATUS FOR SUPPORTING GLASS SHEETS DURING BENDING

Emmett L. Walters, Toledo, Ohio, assignor to Libbey-Owens-Ford Glass Company, Toledo, Ohio, a corporation of Ohio Application March 5, 1947, Serial No. 732,489

1 Claim. (Cl. 49—45)

The present invention relates generally to the bending of glass sheets or plates and more particularly to improved means for supporting said sheets or plates during the bending thereof.

An object of the invention is the provision of means for supporting the glass sheets or plates in a vertical position during bending as well as during the subsequent slow annealing or tempering thereof.

Another object of the invention is the provision of supporting means which will effectively maintain the glass sheets or plates in desired vertical position during bending while at the same time permitting sufficient freedom of movement thereof to effect proper bending.

A further object of the invention is the provision of supporting means which will not tend to mar the surfaces of the glass sheets or plates and so constructed that bending may be accomplished with a minimum liability of breakage or cracking of the glass.

Other objects and advantages of the invention will become more apparent during the course of the following description, when taken in connection with the accompanying drawings.

In the drawings, wherein like numerals are employed to designate like parts throughout the same:

Fig. 1 is a vertical sectional view through one type of glass bending and tempering apparatus with which the present invention may be used;

Fig. 2 is a front view of the glass sheet supporting means provided by the invention;

Fig. 3 is a side view thereof showing the position of the sheet after bending;

Fig. 4 is a detail section of a portion of the supporting means;

Fig. 5 is a detail section of the supporting means taken substantially on line 5—5 of Fig. 2; and Fig. 6 is a sectional view of a modified form of glass support.

With reference now to the drawings, and particularly to Fig. 1, the letter A designates in its entirety any suitable type furnace in which the glass sheets to be bent are adapted to be heated to the required temperature for bending, while B designates generally bending apparatus mounted above the furnace, and C the improved means herein provided for supporting the glass sheet or plate 10 during the heating and bending operations.

Although the bending apparatus B has been illustrated as being mounted directly above a so-called pit type furnace A, it will be understood that any suitable kind of furnace may be employed. Also that the bending apparatus may be associated with the furnace in any desired manner, so that the invention is not limited to the use of any particular type of furnace or to any particular association between the furnace and bending apparatus.

After the glass sheet 10 has been brought to the proper temperature within furnace A, it is adapted to be lifted vertically through an opening 11 in the top thereof into position for bending as indicated by broken lines in Fig. 1. The bending apparatus B comprises the horizontally spaced convex and concave bending or mold members 12 and 13 of preferred width and height and provided with inner complementary convex and concave bending surfaces 14 and 15 respectively, the curvature of which corresponds to the curvature to be given the glass sheet 10.

The mold members 12 and 13 are movable horizontally toward and away from one another, and to this end may be carried by horizontal plungers 16 and 17 operating within cylinders 18 and 19 respectively. The horizontal movement of said mold members is controlled in any well known manner by hydraulic or air pressure within said cylinders.

After the glass sheet 10 has been bent between the mold members 12 and 13, it can either be annealed by a slow and gradual cooling thereof or, if preferred, the bent sheet may be tempered by subjecting it to a sudden cooling or chilling treatment as well known in the art. If it is desired to temper the bent sheet, spaced blower heads 20 and 21 are mounted above the mold members 12 and 13. Upon completion of the bending operation, the mold members are separated and the bent glass sheet either raised to a position between the blower heads 20 and 21 or said blower heads moved downwardly to a position at opposite sides of the glass sheet. When the sheet is in proper position between the blower heads, it is subjected to suitable air blasts, during which operation the blower heads may be oscillated to obtain the desired distribution of the chilling air over the glass.

Referring particularly to Figs. 2 and 3 the improved supporting means C for the glass sheet 10 comprises the upper and lower substantially rectangular frames 22 and 23 pivotally connected by bolts or the like 24 so that the lower frame 23 is free to swing relative to the upper frame and can hang vertically at all times. The sheet of glass 10 is supported in the lower frame 23 at its bottom edge and adjacent its opposite ends by spaced blocks 25 which are preferably formed of a ceramic material. These blocks are provided in their upper faces with grooves 26 in which the bottom edge of the glass sheet is received, and the bottoms of the grooves are preferably shaped to correspond to the shape of the bottom edge of the sheet. This will provide relatively wide supporting surfaces for the sheet and will enable the weight of the glass to be uniformly distributed between the blocks.

Each of the supporting blocks 25 is carried at the upper end of a vertical pin 27 provided with a reduced portion 28 rotatably received in a bearing sleeve 29 which passes upwardly through the bottom cross member 30 of frame 23 and is secured thereto by welding or the like as indicated at 31. Thus, the block 25 is rotatably supported by the bearing sleeve 29 and is free to turn during the bending of the glass sheet.

Blocks 32 similar to blocks 25 are provided to engage the top edge of the glass sheet 10, and are provided with grooves 33 for receiving the upper marginal edge portion of the sheet therein. The blocks 32 are carried at the lower ends of vertical stub shafts 34 which pass upwardly through the horizontal cross members 35 of lower frame 23 and are vertically slidable and freely rotatable therein. The blocks 32 are normally maintained in engagement with the upper edge of the glass sheet by their own weight.

As illustrated in Fig. 2, the upper frame 22 of glass supporting means C may be provided with wheels 36 adapted to ride along a horizontal rail 37 for conveying the glass sheet to and from the area of operation. Thus, the supporting means and glass sheet to be bent may be moved along the rail to a position where they can be raised therefrom by a suitable hoist 38 and carried into position for lowering into the furnace A. After the glass has become heated to the required temperature, the supporting means can be lifted by the hoist 38 to locate the sheet between the mold members 12 and 13, and after bending can be raised to a position between the blower heads 20 and 21 or the blower heads lowered to a position inwardly of the mold members.

When the glass sheet is bent, the blocks 25 and 32 of the supporting means will be received in notches 39 and 39' formed in the mold members at the upper and lower ends thereof. During the bending of the sheet, the supporting blocks 25 and 32 can turn freely about their vertical axes in the frame 23 and in this way automatically adjust themselves to the particular bend or curvature being given the glass sheet. Because they are freely rotatable, the blocks 25 and 32 will effectively maintain the glass sheet in desired vertical position during bending without binding in the grooves 26 and 33 and with minimum liability of breakage of the glass.

The wheels 36 can, if desired, be utilized to convey the supporting means and glass sheet horizontally through a continuous type furnace and between mold members located in alignment therewith at one end thereof, or for conveying the bent sheet through an annealing leer if a slow and gradual annealing of the glass is preferred.

In Fig. 6 is illustrated a modified type of support for the glass sheet comprising a pair of spaced supporting blocks 40 and 41 secured to the opposite ends of a horizontal supporting bar 42 and having grooves 40' and 41' respectively for receiving the lower edge of the glass sheet 10 therein. The bar 42 is received in a groove in the upper end of a vertical stub shaft 43, being pivotally connected thereto by a transverse pin 44 passing through a horizontal slot 45 in the bar 42 intermediate the ends thereof. The bottom of the groove in the upper end of stub shaft 43 is provided with an arcuate surface 46 on which the bar 42 can rock so that the blocks 40 and 41 can automatically adjust themselves to the shape of the lower edge of the glass sheet.

The lower end of the stub shaft 43 is reduced in diameter as at 48, and this reduced portion is rotatably mounted in a bearing sleeve 49 passing through the bottom cross member 30 of frame 23 and welded or otherwise secured thereto as at 50. The shoulder created by the reduction in the diameter of the stub shaft 43 is formed to provide a cam surface 51 which engages and is supported upon a matching cam surface 52 provided at the upper end of the bearing sleeve 49.

When the glass sheet 10 is bent, the bending will cause a longitudinal displacement of the points of engagement between the glass and the blocks 40 and 41 due to the bringing of the ends of sheets closer together. When this occurs, the blocks and supporting bar 42 may also move horizontally relative to the stub shaft 43 as they shift with respect to the pin 44 in slot 45. Also, the bending of the glass sheet will tend to cause a vertical displacement of the lower edge of the sheet relative to the supporting blocks. To compensate for this displacement, the stub shaft 43 will be turned about its axis and the cam surface 51 formed thereon will ride on the stationary cam surface 52 to raise the blocks so that they follow the upward movement of the lower edge of the sheet whereby to maintain a solid support therefor.

It has heretofore been customary to suspend the glass sheet during tempering from a plurality of small tongs engaging the same near its upper edge, but this type of support ordinarily results in some penetration of the surfaces of the sheet by the gripping elements, especially during the heating thereof. Although in certain installations the indentations formed in the sheet by these gripping elements may be covered by a frame or sash, in many cases the indentations cannot be covered and are objectionable. Due to the physical characteristics of tempered glass, it is not possible to cut the treated sheet and so remove the indentations, because any attempt to cut the sheet results in a complete breakage thereof. With the supporting means herein provided, this objectionable marking of the glass sheet is eliminated.

It is to be understood that the form of the invention herewith shown and described is to be taken as the preferred embodiment of the same, and that various changes in the shape, size and arrangement of parts may be resorted to without departing from the spirit of the invention or the scope of the subjoined claim.

I claim:

Apparatus for supporting a glass sheet during bending, comprising a frame, upper and lower supporting members rotatably carried by said frame and engaging the glass sheet to maintain it in a vertical position, each lower supporting member comprising a substantially horizontal bar having means engaging the lower edge of the sheet at spaced points, a vertical stub shaft, means for connecting said bar intermediate its ends to the upper end of the stub shaft for free horizontal and rocking movement relative thereto, the lower end portion of said stub shaft being reduced in diameter to provide a shoulder having a cam surface, and a vertical bearing sleeve mounted in said frame and freely receiving the reduced portion of said stub shaft therein, the upper end of said bearing sleeve being provided with a cam surface engaging said first cam surface to effect the raising of said horizontal bar upon turning of the stub shaft in said bearing sleeve.

EMMETT L. WALTERS.

REFERENCES CITED

The following references are of record in the file of this patent:

UNITED STATES PATENTS

| Number | Name | Date |
|---|---|---|
| 2,062,567 | Forbes | Dec. 1, 1936 |
| 2,239,535 | Minton et al. | Apr. 22, 1941 |
| 2,379,244 | Minton | June 26, 1945 |

FOREIGN PATENTS

| Number | Country | Date |
|---|---|---|
| 393,491 | Great Britain | June 8, 1933 |